March 25, 1958 J. GIBSON 2,827,680
WEDGE-EYE CABLE ANCHORING DEVICES
Filed July 21, 1955 2 Sheets-Sheet 1

INVENTOR.
Jack Gibson
BY Robert H. Wendt
Attorney

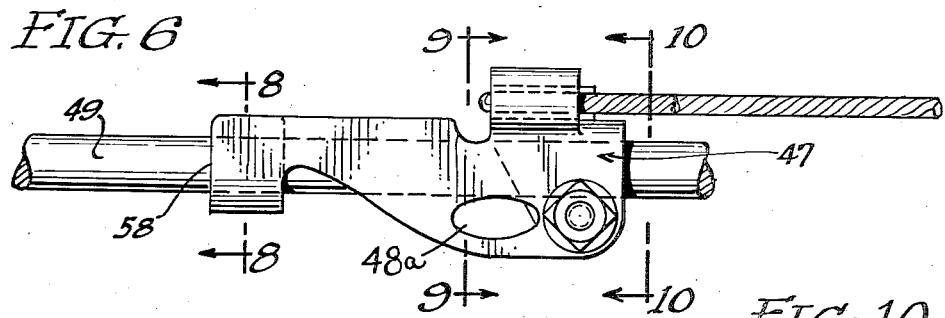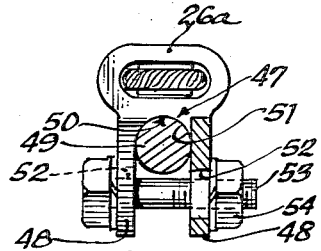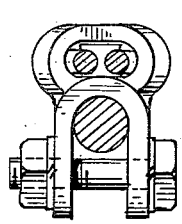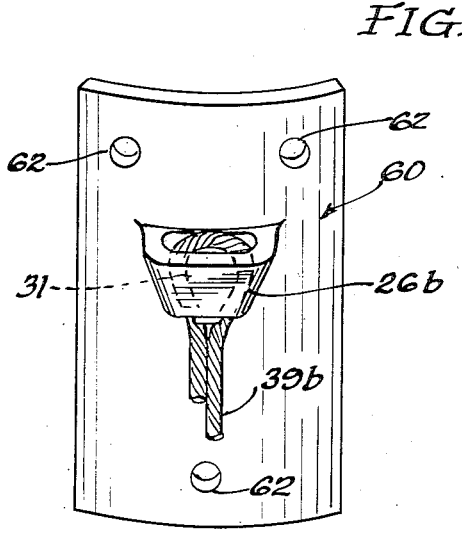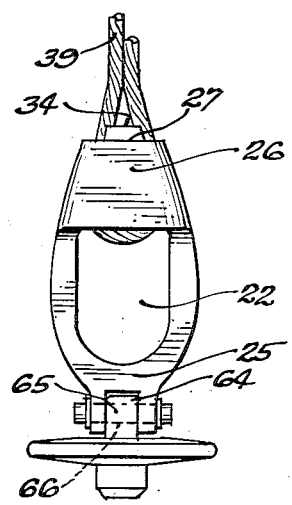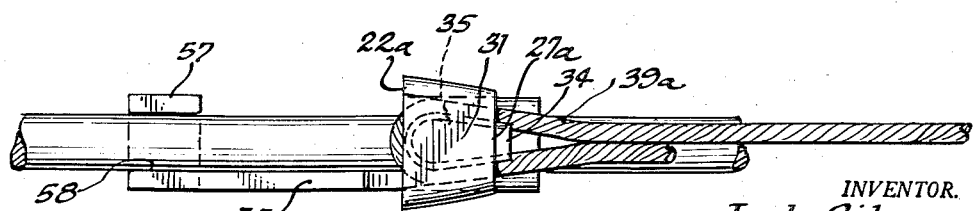

United States Patent Office 2,827,680
Patented Mar. 25, 1958

2,827,680

WEDGE-EYE CABLE ANCHORING DEVICES

Jack Gibson, Fort Wayne, Ind.

Application July 21, 1955, Serial No. 523,411

3 Claims. (Cl. 24—126)

The present invention relates to wedge-eye cable anchoring devices, and is particularly concerned with improved structures for securing cables to guy rods, guy bolts, anchoring saddles, insulators, pulling eye units, and service drop cables.

One of the objects of the invention is the provision of an improved securing means for securing the end of a cable to a guy rod, guy bolt, pulling eye, or other anchoring devices which eliminates the necessity for using any cable clamps, and in which the cable is bent about a yoke provided with a groove, the yoke having a wedge formation which is pulled into a tapered opening in an eye in such manner that the cable is automatically clamped, and cannot be released as long as there is any tension on the fixture and cable.

Another object of the invention is the provision of improved guy rods, guy bolts, and guy nuts provided with a wedge-shaped member having a groove which receives the cable, the groove extending about a curved yoke on the wedge to form a U-shaped bend in the cable, and the wedge being inserted in a complementary wedge socket which engages the sides of the cable and holds the cable tightly against the wedge, while the cable is snubbed about the wedge.

Another object of the invention is the provision of improved wedge securing devices for a cable, including a wedge about which the cable is curved, and a housing into which the wedge is drawn which are adapted to be used for dead-end fixtures or for pulling eyes, or for securing drop service conductors.

Another object of the invention is the provision of an improved drop service conductor anchoring device which can be secured on a messenger cable at any point between the two line poles where it may be convenient to have the service conductor extend from an anchoring device to a house or other point of service, instead of being confined to locations on line poles where there may be obstructions or where a longer service line may be required.

Another object of the invention is the provision of improved cable securing devices for guying fixtures and guying cables, in which the fixture is provided with a tapered housing for receiving a wedge with a cable bent about the wedge, and in which the pull on the cable automatically clamps the cable against the wedge with the cable bent about the wedge on a radius which does not damage the cable.

Other objects and advantages of the invention will be apparent from the following description and the accompanying drawings, in which similar characters of reference indicate similar parts throughout the several views.

Referring to the three sheets of drawings accompanying this specification,

Fig. 6 is a fragmentary side elevational view of a similar cable anchoring device, taking the place of a pulling eye on a guy rod;

Fig. 7 is a top plan view of Fig. 6;

Fig. 8 is a sectional view taken on the plane of the line 8—8 of Fig. 6, looking in the direction of the arrows;

Fig. 9 is a sectional view taken on the plane of line 9—9 of Fig. 6, looking in the direction of the arrows;

Fig. 10 is a sectional view taken on the plane of the line 10—10 of Fig. 6;

Fig. 11 is a view in perspective of a pole saddle plate provided with a similar cable anchoring device; and Fig. 12 is a fragmentary side elevational view of a dead-end clamp embodying the invention.

Figure 1:
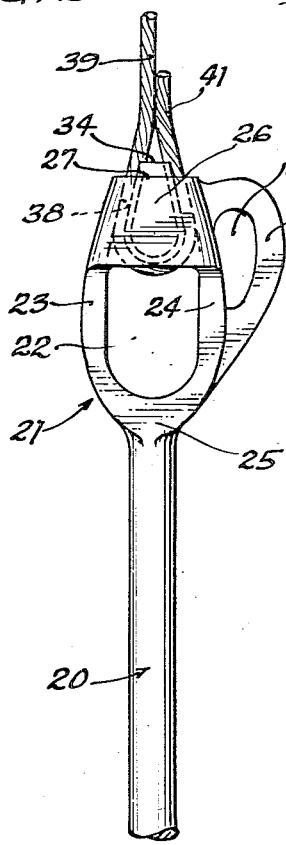
Fig. 1 is a fragmentary side elevational view of a guy rod provided with a cable anchoring device embodying the invention.

Referring to Figs. 1 to 5, 20 indicates the upper end portion of a guy rod which may be of any of the standard types, such as those having a pointed head or those having a threaded end provided with a nut for securing an anchor.

The guy rod 20 is provided with a head formation 21, having an eye 22 extending through it from side to side and formed by a pair of longitudinally extending legs 23 and 24, joined by a yoke 25, which is integrally secured to the guy rod 20.

The legs are joined by a transversely extending housing 26, which may taper toward the end 27, but which is oval in shape and has a pair of parallel sides 28 and 29 surrounding a central oval aperture 30.

Figure 5:
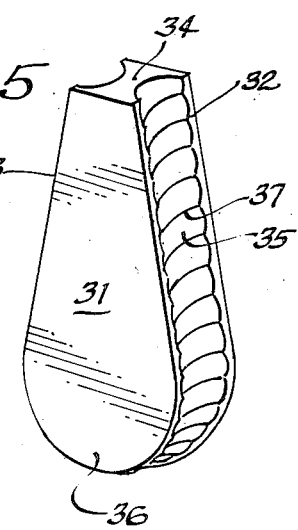
Fig. 5 is a view in perspective of the wedge employed in Figs. 1 to 4.
Figure 4:
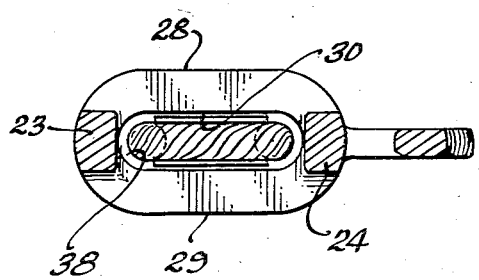
Fig. 4 is a sectional view taken on the plane of the line 4—4 of Fig. 3, looking in the direction of the arrows.

The eye 22 is large enough to pass a wedge 31 of the type shown in Fig. 5, which may have a pair of flat sides 32, 33, tapering toward a flat end 34 and provided with a pair of grooves 35 in the tapered sides 32, 33.

The wedge 31 has a partially circular end portion 36 about which the groove 35 extends, and the partially circular end portion 36 is formed on an easy bend so that the cable is not sharply bent when it passes about the wedge.

The groove 35 is preferably formed with spirally extending cable strand formations 37, substantially fitting the shape of the cable when it is bent about the wedge.

Figure 2:
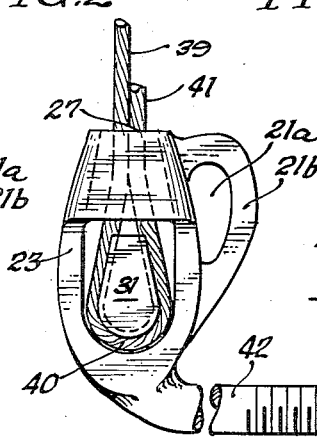
Fig. 2 is a similar fragmentary view of an angle bolt provided with the same anchoring device shown with its parts in the position that they assume before the wedging action takes place.

The size of the eye 22 in the head 21 is such that the bent cable and wedge 31 may pass into the eye 22 in the position shown in Fig. 2.

Head formation 21 has a laterally projecting eye 21a formed by an integral loop 21b, and used to attach a hoist or tackle which takes up slack in cable 39 by using a come-along cable clamp.

The housing 26 of the head 21 has the inner grooved formations 38 on each side of the cable and wedge for receiving the cable and clamping it when the cable is driven or drawn upward into the housing 26 in Fig. 1.

The manner of installation and operation of this device is as follows:

The cable 39 is bent back upon itself at 40 into substantially U-shape and is inserted in the aperture 30 of the housing in such manner that the U-shaped formation 40 extends into the eye 22.

If necessary this U-shaped formation 40 may be inserted still farther beyond the position of Fig. 2 and outside of the eye 22 for insertion of the wedge 31 in the U-shaped formation.

With the cable extending tightly about the wedge 31 the cable is pulled backward, that is, upward in Fig. 2, until the U-shaped formation 40 about the wedge 31 can be located in the eye 22, as shown in Fig. 2.

A pull on the cable 39 and its loose end 41 will cause the wedge 31 to move into the aperture 30 and eventually the cable will be clamped between the grooves 35 on the wedge and the grooves 38 inside the housing.

A further pull on the cable and its loose end will draw the wedge 31 into the position of Fig. 1, where the pull on the cable 39 draws the wedge still more tightly and prevents its release.

The wedge 31 preferably projects out of the housing 26 so that it may be released by hammering on its end 34, and the hammering may be continued by using a punch and hammer on the end 34 until the wedge moves into the position of Fig. 2 to release the cable.

Thus the cable may be secured to guy rods, guy bolts, guy nuts, etc., without the use of any cable clamps or bolts; and the functions of a cable clamp are performed by the wedging fixture and at a minimum amount of expense.

Figure 3:
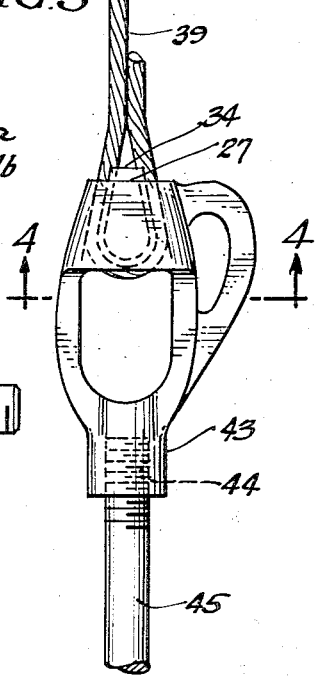
Fig. 3 is a view similar to Fig. 1, in which the wedging device is in the form of a guy rod head attached by threads to a bolt or guy rod.

Besides guy rods, guy bolts may be provided with such a head and wedging fixture, and one form of transverse guy bolt is shown at 42 in Fig. 2. In Fig. 3 the wedging fixture embodied in the head 21 is provided with a threaded socket 43 for receiving the threaded end 44 of a threaded guy rod or bolt 45.

Referring to Fig. 6, this is an example of how such a wedging securing device may be used to secure a cable to the equivalent of a pulling eye. Such a pulling fixture is shown in Fig. 6, where the fixture has a U-shaped body 47, the two side flanges 48 of which extend about a guy rod 49.

This pulling fixture may have the groove 50 between the flanges 48, the groove having a partially cylindrical inner surface 51 for fitting about a guy rod 49.

The flanges 48 have aligned through bores 52 for receiving the clamping screw bolt 53, having nut 54 on its threaded end.

At the end opposite to the bolt 53, the U-shaped body 47 is cut away at the top at 55 and has one of its side flanges 48 extended downward and under the rod 49 at 56.

The under portion 56 extends upward on the other side of the guy rod, terminating at 57, and being provided with a U-shaped groove 58 for receiving the guy rod. There is sufficient clearance between 59 and 55 on the body to pass the guy rod 49, so that the hook of which the groove 58 is a part may be extended about the guy rod 49 when the bolt is removed.

The fixture then fits about the guy rod with the cylindrical groove 51 and is secured by means of the bolt and nut 53, 54. Thus this fixture can be attached to guy rods which are already installed in the ground for the purpose of using my wedging structure to secure a cable to the guy rod.

Referring to Figs. 6, 7 and 8, the body 47 again has an integral housing 26a secured to it which has a small aperture at the end 27a, and a larger aperture at the opposite end 22a. The housing 26a is again oval and forms an integral part of the fixture 47, and it has the same wedging member 31 with the cable 39a extending about the groove 35 in the wedge and clamped between the wedge and the inside of the housing.

The operation of the wedge and housing on the cable is exactly the same as described in regard to Figs. 1 to 5, except that there is no eye into which the wedge is to be inserted in this case.

One flange 48 of body 47 has an aperture 48a, serving as an eye for attachment of tackle to take up the slack in the cable.

Referring to Fig. 11, this is a modification in which a curved saddle plate 60 has a concave curvature 61 on one side for fitting against a pole to which it may be secured by bolts passing through the apertures 62.

The saddle plate 60 has an integral tapered housing 26b secured to it and formed in a manner exactly similar to the housing 26a or the housing 26, and provided with a tapered wedge 31 similar in structure to those previously described.

Thus the cable 39b may be secured to the saddle plate by means of the wedge 31 without the use of any bolts or cable clamps.

Referring to Fig. 12, this is a modification in which an eye structure similar to that shown in Fig. 1, and provided with the same housing and wedge is adapted for securement to an insulator 63.

The insulator has a projecting lug 64 with a bore 65 for receiving pin 66. Lug 64 is secured by the pin 66 to a clevis on yoke 25. Thus the present wedging structure may be secured to an insulator for a dead-end fixture.

It will thus be observed that I have invented a cable securing device which may be tightened by a pull on the cable, and it may again be released by relieving the pull and driving the wedge free with a hammer or other tool.

The present cable clamp is adapted to permit the use of an easy bend in the cable and has the cable located in a complementary groove, so the cable will not be flattened but is secured in an outer groove by means of a wedge.

The present wedging anchor is adapted for guy rods, guy bolts, guy nuts, service fixtures, pulling fixtures, dead-end fixtures, saddle type fixtures and many others.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An anchoring member for cables comprising an integral tapered metal housing having a through chamber which is larger at one end, the said chamber being defined by opposite side walls and by opposite tapered edge walls, the edge walls having a groove on the inside for receiving the cable, and a wedging member having a larger end and tapering toward a smaller end on an angle which is substantially the same as the taper of the housing edge walls, the said wedging member being provided with a groove in its tapered side walls for receiving the cable, and the cable being clamped in the groove of the edge walls and the groove of the wedge, the said wedge having its larger end provided with an easy curvature containing the groove for said cable, and the cable being bent about the larger end of the wedge and both ends of the cable extending from the smaller end of the housing, the said housing being integrally secured to a pulling fixture having a pair of U-shaped flanges fitting about a guy rod, and having a transverse bolt through said flanges for clamping it on the guy rod, the said fixture also having a body portion extending in the opposite direction from said bolt and formed with a hook-shaped portion open at the top and adapted to hook around that side of the guy rod on which the bolt is secured.

2. An anchoring member for cables comprising an integral tapered metal housing having a through chamber which is larger at one end, the said chamber being defined by opposite side walls and by opposite tapered edge walls, the edge walls having a groove on the inside for receiving the cable, and a wedging member having a larger end and tapering toward a smaller end on an angle which is substantially the same as the taper of the housing edge walls, the said wedging member being provided with a groove in its tapered side walls for receiving the cable, and the cable being clamped in the groove of the edge walls and the groove of the wedge, the said wedge having its larger end provided with an easy curvature containing the groove for said cable, and the cable being bent about the larger end of the wedge and both ends of the cable extending from the smaller end of the housing, the said housing being integrally secured to a pulling fixture having a pair of U shaped flanges fitting about a guy rod, and having a transverse bolt through said flanges for clamping it on the guy rod, the said fixture also having a body portion extending in the opposite direction from said bolt and formed with a hooked shaped portion open at the top and adapted to hook around that side of the guy rod on which the bolt is secured, one of said U shaped flanges being provided with a through aperture for securing a hoist or the like for tightening the cable on the guy rod preliminary to the clamping of the flanges on the guy rod.

3. An anchoring member for cables comprising an integral tapered metal housing having a through chamber which is larger at one end, the said chamber being defined by opposite side walls and by opposite tapered edge walls, the edge walls having a groove on the inside for receiving the cable, and a wedging member having a larger end and tapering toward a smaller end on an angle which is substantially the same as the taper of the housing edge walls, the said wedging member being provided with a groove in its tapered side walls for receiving the cable, and the cable being clamped in the groove of the edge walls and the groove of the wedge, the said wedge having its larger end provided with an easy curvature containing the groove for said cable, and the cable being bent about the larger end of the wedge and both ends of the cable extending from the smaller end of the housing, the said housing being integrally secured to a pulling fixture having a pair of U shaped flanges fitting about a guy rod, and having a transverse bolt through said flanges for clamping it on the guy rod, the said fixture also having a body portion extending in the opposite direction from said bolt and formed with a hooked shaped portion open at the top and adapted to hook around that side of the guy rod on which the bolt is secured, the said U shaped flanges being integrally secured to said body having an additional U shaped formation extending about the guy rod.

References Cited in the file of this patent

UNITED STATES PATENTS

| 1,644,375 | Haworth | Oct. 4, 1927 |
| 1,955,450 | Blackburn | Apr. 17, 1934 |
| 2,217,042 | Bowman | Oct. 8, 1940 |

FOREIGN PATENTS

| 612,290 | Germany | Apr. 17, 1935 |
| 775,474 | France | Dec. 28, 1934 |